United States Patent
Oglesby et al.

(10) Patent No.: US 6,591,926 B2
(45) Date of Patent: Jul. 15, 2003

(54) SYSTEM AND METHOD FOR RECOVERING ENERGY OF A HYDROGEN GAS FUEL SUPPLY FOR USE IN A VEHICLE

(75) Inventors: Keith Andrew Oglesby, Livonia, MI (US); Kurt David Osborne, Dearborn, MI (US); Woong-chul Yang, Ann Arbor, MI (US)

(73) Assignee: Ford Motor Company, Dearborn, MI (US)

(*) Notice: Subject to any disclaimer, the term of this patent is extended or adjusted under 35 U.S.C. 154(b) by 6 days.

(21) Appl. No.: 09/848,022

(22) Filed: May 3, 2001

(65) Prior Publication Data

US 2002/0162698 A1 Nov. 7, 2002

(51) Int. Cl.[7] ................................................. B60K 6/00
(52) U.S. Cl. ......................................... 180/65.3; 429/25
(58) Field of Search ................................ 180/65.1, 65.2, 180/65.3, 65.4, 65.5, 65.8; 429/13, 9, 34, 25

(56) References Cited

U.S. PATENT DOCUMENTS

| | | | | |
|---|---|---|---|---|
| 5,106,035 A | * | 4/1992 | Langford, III | 244/53 R |
| 5,948,221 A | * | 9/1999 | Hsu | 204/270 |
| 6,012,289 A | * | 1/2000 | Deckard et al. | 60/602 |
| 6,213,234 B1 | * | 4/2001 | Rosen et al. | 180/65.3 |
| 6,296,959 B2 | * | 10/2001 | Takabe et al. | 429/20 |
| 6,365,290 B1 | * | 4/2002 | Ghezel-Ayagh et al. | 438/166 |
| 6,403,243 B1 | * | 6/2002 | Herdeg et al. | 429/12 |
| 6,423,435 B1 | * | 7/2002 | Autenrieth et al. | 429/13 |
| 6,428,915 B1 | * | 8/2002 | Ban et al. | 429/12 |
| 6,436,562 B1 | * | 8/2002 | DuBose | 429/13 |
| 6,436,563 B1 | * | 8/2002 | Frank et al. | 429/17 |

* cited by examiner

Primary Examiner—Brian L. Johnson
Assistant Examiner—Christopher Bottorff
(74) Attorney, Agent, or Firm—Carlos L. Hanze

(57) ABSTRACT

A system 10 is provided for recovering the potential energy of a hydrogen gas fuel supply within a fuel cell powered vehicle 14. The system 10 includes a conventional storage tank 16 which receives and stores hydrogen gas at a relatively high pressure, an energy conversion unit or assembly 18, a compressor unit or assembly 20, pressure regulators 22, 24, a valve 26, an electrical charge storage device or battery 28, a controller 30, vehicle sensors 32 and electrical switches or switching module 34. The system 10 selectively channels pressurized hydrogen gas through energy conversion unit 18 which lowers the pressure of the hydrogen gas and generates electricity. Controller 30 causes the generated electricity to be selectively communicated to compressor 20, electrical accessories 72, and/or to battery 28 by use of switching module 34, based upon vehicle attribute data received from sensors 32.

13 Claims, 1 Drawing Sheet

SYSTEM AND METHOD FOR RECOVERING ENERGY OF A HYDROGEN GAS FUEL SUPPLY FOR USE IN A VEHICLE

FIELD OF THE INVENTION

This invention relates to a system and a method for recovering potential energy of a hydrogen gas fuel supply in a vehicle and more particularly, to a system and method which uses a turbine and generator to recover potential energy stored within hydrogen gas that is supplied to a fuel cell that is used to power the vehicle, thereby improving the efficiency and the fuel economy of the vehicle.

BACKGROUND OF THE INVENTION

In order to reduce automotive emissions and the demand for fossil fuel, automotive vehicles have been designed that are powered by electrical devices such as fuel cells. These fuel cell-powered electric vehicles reduce emissions and the demand for conventional fossil fuels by eliminating the internal combustion engine (e.g., in completely electric vehicles) or by operating the engine at only its most efficient/preferred operating points (e.g., in hybrid electric vehicles).

Many fuel cells consume hydrogen gas and air (e.g., as a reaction constituent). The consumed hydrogen and air must be properly stored and transferred to the fuel cell at certain pressures in order to allow the fuel cell and vehicle to operate in an efficient manner.

Vehicles employing these types of fuel cells often include systems and/or assemblies for storing and transmitting hydrogen gas and air to the fuel cell. Particularly, the hydrogen gas is typically stored within a tank at a relatively high pressure and with a relatively high amount of potential energy. The hydrogen gas is then transferred to the fuel cell by use of several conduits and several pressure-reducing regulators which lower the pressure of the gas by a desirable amount. While the pressure of the hydrogen gas leaving the fuel tank is substantially lowered prior to entering the fuel cell, it is above normal atmospheric pressures which is required for efficient operation. The air that is communicated from the fuel cell is obtained at atmospheric pressures and must be pressurized or otherwise driven through the system in order to ensure proper and efficient fuel cell operation. This pressurization and/or driving of air through the system is typically performed by use of one or more compressors or turbines. These compressors or turbines require electrical energy for their operation, and therefore drain the vehicle's battery and use generated electrical energy, which could otherwise be used to power the vehicle's electrical components and accessories.

There is therefore a need for a new and improved system and method for use with a fuel cell powered vehicle which recovers the potential energy stored within hydrogen gas and which converts that potential energy to electrical energy that can be used to supplement the electrical power demands of the vehicle and/or the vehicle's air compressor, or may be stored within an electrical storage device.

SUMMARY OF THE INVENTION

A first non-limiting advantage of the invention is that it provides a system and method for recovering the potential energy of the compressed gas stored within a fuel cell powered vehicle.

A second non-limiting advantage of the invention is that it provides a system and method for recovering the potential energy of the hydrogen gas stored within a fuel cell powered vehicle and which converts the potential energy into electrical energy which is used to supplement the electrical power demands of the vehicle and/or the vehicle's air compressor, or which may be stored within an electrical storage device.

According to a first aspect of the present invention, a system is provided for recovering potential energy from a hydrogen gas fuel supply that is used to power a fuel cell within a vehicle. The system includes a fuel tank which stores pressurized hydrogen gas; a conduit system which selectively and fluidly couples the fuel tank to the fuel cell; and an energy conversion unit including a turbine which is disposed within the conduit system and which is selectively and rotatably driven by the pressurized hydrogen gas, effective to generate torque and lower the pressure of the hydrogen gas, and a generator which is coupled to the turbine and which utilizes torque generated by the turbine to generate electrical power.

According to a second aspect of the present invention, a method is provided for generating electricity in a vehicle including a tank of pressurized gas and a fuel cell which consumes the pressurized gas. The method includes the steps of: providing a first conduit system for transferring the pressurized gas from the tank to the fuel cell; providing an expander; operatively disposing the expander within the first conduit system; providing a generator for producing electrical power; operatively connecting the expander to the generator; and channeling the pressurized gas through the expander, effective to rotatably drive the expander, thereby causing the generator to produce electrical power.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
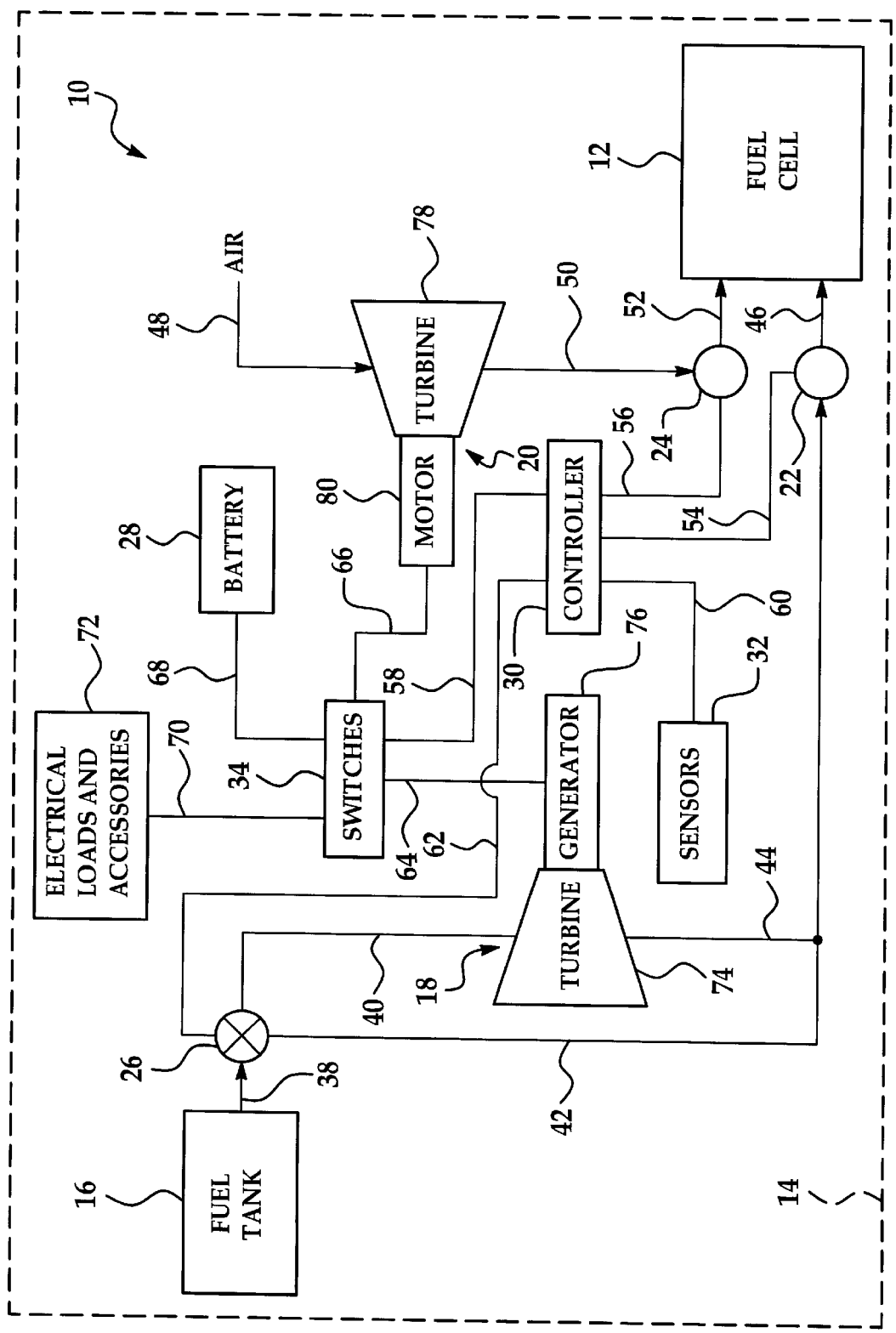
FIG. 1 is a block diagram of a system which is made in accordance with the teachings of the preferred embodiment of the invention, which is adapted for use with a fuel cell powered vehicle and which is effective to recover the potential energy stored within hydrogen gas that is used to power the vehicle's fuel cell.

Referring now to FIG. 1, there is shown a block diagram of a system 10, which is made in accordance with the teachings of the preferred embodiment of the invention, and which is effective to recover potential energy that is stored within the hydrogen gas that is supplied to one or more fuel cells 12 within a vehicle 14. Particularly, system 10 is adapted for use in combination with a vehicle 14 including one or more hydrogen-based fuel cells 12 which provide power to the vehicle 14. In the preferred embodiment, vehicle 14 is an electric or a hybrid-electric vehicle. In the preferred embodiment, fuel cells 12 utilize a chemical reaction that consumes hydrogen gas to generate electrical power. It should be appreciated that while in the preferred embodiment of the invention, fuel cells 12 are of the type which consume hydrogen gas, in other alternate embodiments, other types of compressed gasses can be used to generate power within the fuel cell 12, and system 10 would work in a substantially identical manner to recover potential energy stored within those compressed gasses and provide substantially identical benefits.

System 10 includes a conventional storage tank 16 which receives and stores hydrogen gas at a relatively high pressure, an energy conversion unit or assembly 18, a compressor unit or assembly 20, pressure regulators 22, 24, a valve 26, an electrical charge storage device or battery 28, a controller 30, vehicle sensors 32 and electrical switches or switching module 34.

The system 10 further includes a first conduit system have several tubes or conduits disposed throughout the vehicle 14, which selectively carry and transport the hydrogen gas from the tank 16 to the fuel cell 12. Particularly, fuel tank 16 is fluidly coupled to valve 26 by use of conduit 38, valve 26 is fluidly coupled to energy conversion unit 18 by use of conduit 40 and to regulator 22 by use of conduit 42. Energy conversion unit 18 is fluidly coupled to conduit 42 and to regulator 22 by use of conduit 44, and regulator 22 is fluidly coupled to fuel cell 12 by use of conduit 46.

A second conduit system fluidly couples fuel cell 12 to a source of air. Particularly, compressor unit 20 is fluidly coupled to and receives air through conduit 48, and is further fluidly coupled to regulator 24 by use of conduit 50. Regulator 24 is fluidly coupled to fuel cell 12 by use of conduit 52. It should be appreciated that the present invention is not limited to the foregoing conduit systems or configurations, and that in alternate embodiments, different and/or additional numbers of conduits may be used to interconnect the various components of system 10. For example and without limitation, vehicle 14 may further include exhaust and/or return conduit systems (not shown) which are effective to treat and/or remove exhaust gasses from the system and/or to return unused hydrogen gas to the fuel cell 12.

Controller 30 is respectively, electrically and communicatively coupled to regulators 22, 24 by use of electrical buses 54, 56, to switching module 34 by use of electrical bus 58, to sensors 32 by use of electrical bus 60, and to valve 26 by use of electrical bus 62. Switching module 34 is further respectively, electrically and communicatively coupled to energy conversion unit 18 by use of power bus 64, to compressor unit 20 by use of power bus 66, battery 28 by use of power bus 68, and to vehicle electrical accessories and components 72 by use of power bus 70.

In the preferred embodiment, controller 30 is a conventional microprocessor based controller and in one non-limiting embodiment, controller 30 comprises a portion of a conventional engine control unit ("ECU"). In other alternate embodiments, controller 30 is externally coupled to the engine control unit.

Fuel tank 16 is a conventional storage tank which is adapted to receive and store compressed gaseous fuel, such as hydrogen gas, at relatively high pressures. In the preferred embodiment, energy conversion assembly 18 includes a turbine 74 which is rotatably driven by pressurized gas received from tank 16. Turbine 74 is operatively coupled to a conventional generator 76 by use of a shaft (not shown). The rotation of turbine 74 is used by the generator 76 to generate electrical energy in a conventional manner. After passing through turbine 74, the gas is communicated to fuel cell 12 by way of conduits 44, 42, 46 and regulator 22.

In the preferred embodiment, compressor assembly 20 includes a motor 80 and a turbine 78 which is coupled to and rotatably driven by motor 80. Turbine 78 is in fluid communication with conduit 48 and is effective to "draw in" air through conduit 48, to compress or pressurize the air and to communicate the pressurized air to fuel cell 12 by use of conduits 50, 52 and regulator 24.

In the preferred embodiment, regulators 22, 24 are conventional electronically controlled pressure regulators which respectively control the pressure of the hydrogen gas and air entering into fuel cell 12. Particularly, regulators 22 and 24 receive signals from controller 30 which are effective to control the operation of regulators 22, 24. Controller 30 controls the amount that the regulators 22, 24 decrease the pressure of the gas and air provided to fuel cell 12 based upon vehicle operating data that is received from conventional vehicle operating sensors 32. In alternate embodiments, regulators 22, 24 are mechanically controlled or set regulators.

Sensors 32 comprise conventional and commercially available vehicle operating sensors which measure and/or estimate various vehicle operating attributes, such as the pressures of the hydrogen gas and air within various locations in the system (i.e., within various conduits), the vehicle speed, the engine speed, amount of fuel remaining in tank 16, the pressure of the fuel within tank 16, and/or the state of charge of battery 28. Sensors 32 measure and/or estimate these attributes and communicate signals representing the measured and/or estimated values to controller 30 which uses the signals to operate electrical switches 34, regulators 22, 24 and valve 26 in a desired manner.

Valve 26 is a conventional electronically controlled (e.g., solenoid) valve which allows pressurized gas from fuel tank 16 to be selectively communicated to turbine 74 through conduit 40 or to be selectively communicated directly to regulator 22 through conduit 42. Valve 26 may also be selectively disposed in a closed position in which no gas is allowed to escape from tank 16 through either of conduits 40 or 42.

Electrical switches or switching module 34 includes several conventional electrical switches (e.g., transistors and/or relays) which operate in response to signals received from controller 30 and which allow generator 76 to be selectively and operatively connected to electrical components and accessories 72, to battery 28 and to motor 80. Switching module 34 also allows the battery 28 to be selectively and electrically connected to motor 80. In one non-limiting embodiment, switching module 34 may be integral with controller 30. In another alternate embodiment, switching module 34 may comprise several disparate switches or devices which are each independently connected to controller 30 and which individually receive command signals from controller 30.

In operation, system 10 utilizes the potential energy stored within the hydrogen gas fuel to generate electrical power. Particularly, when the tank 16 is filled, the hydrogen gas is at a relatively high pressure. When the vehicle 14 is operated, the pressure of the hydrogen gas must be substantially reduced prior to being transferred to fuel cell 12. When the tank 16 is substantially filled, this pressure reduction is performed by channeling the pressurized gas through turbine 74. Particularly, controller 30 sends a signal to valve 26, effective to cause valve 26 to channel the gas through conduit 40. When the pressurized gas flows through turbine 74, it is effective to both desirably reduce the pressure of the gas and to rotatably drive turbine 74, thereby creating torque and generating power within generator 76. In this manner, the potential energy stored within the compressed gas is desirably captured and converted into electrical energy. Based upon vehicle attribute or operating data received from sensors 32, controller 30 sends signals to switches 34, in order to direct the generated power to electrical components and accessories 72, effective to provide electrical power to one or more components or accessories 72; to motor 80, effective to drive turbine 78 and to draw in and/or compress air received through conduit 48; and/or to battery 28, effective to recharge the battery 28. Controller 30 determines where to direct the generated electrical power based upon the amount or level of power being generated, and the power requirements or needs of the various components 72, motor 80 and the state of charge of battery 28. The priority and/or sequence in which the various components 72, motor 80 and battery 28 receive power may be selectively programmed into controller 30 and may be based upon any desirable design considerations. Controller 30 will also source electrical power directly from the battery 28 to the motor 80 in the event that sufficient power is not being received from generator 76 to drive motor 80 at a certain desired level.

After the compressed hydrogen gas passes through turbine 74, it traverses conduits 44 and 42 and enters "low pressure" pressure-reducing regulator 22 which lowers the pressure of the gas to a predetermined and/or calibratable level which is necessary for the optimal performance of fuel cell 12 and which may be determined based upon the attributes of fuel cell 12. In the preferred embodiment, controller 30 selectively alters the amount that pressure-reducing regulator 22 lowers the pressure of the hydrogen gas, based upon vehicle attribute or operation condition data, and based upon the pressure of the gas after it traverses turbine 74, which can be sensed in a conventional manner (e.g., by use of a conventional pressure sensors (not shown)).

Controller 30 further controls the operation of "low pressure" pressure-reducing regulator 24 which ensures that the pressure of the compressed air entering fuel cell 12 is equal to a predetermined value which is necessary for optimal performance of fuel cell 12.

As the vehicle 14 is driven and the fuel supply is depleted, the pressure of the hydrogen gas within the system decreases. Controller 30 monitors this pressure by use of sensors 32 and when the pressure falls below a certain predetermined and/or calibratable level, controller 30 generates a signal to valve 26 effective to actuate valve 26 and cause the hydrogen gas from tank 16 to bypass energy conversion unit 18 and to flow directly to pressure-reducing regulator 22 through conduit 42. System 10 performs this "bypass" function to ensure that pressure of the hydrogen gas entering fuel cell 12 is sufficient for optimal performance of the fuel cell 12. That is, when the pressure of the gas in tank 16 falls below a certain level, the pressure drop over the turbine 74 or energy conversion unit 18 may cause the pressure of the hydrogen gas to fall below a value which is required for optimal performance of the fuel cell 12. In these situations energy conversion unit 18 is bypassed and pressure-reducing regulator 22 is accordingly adjusted to provide the desired pressure decrease.

In this manner, system 10 efficiently utilizes and recovers the potential energy stored within the compressed hydrogen gas by use of energy conversion unit 18. This potential energy is converted into electrical power which is used to selectively power various components and/or to recharge the vehicle's battery 28. Energy conversion unit 18 further eliminates the need for a "high-pressure" pressure-reducing regulator, by desirably lowering the pressure of the hydrogen gas by a substantial amount (e.g., by at least a factor of 10) prior to the gas passing through low pressure step-down regulator 22 and into fuel cell 12. System 10 also provides the flexibility to bypass the energy conversion unit 18 in certain situations, thereby substantially guaranteeing that the gas entering fuel cell 12 will be of a sufficient pressure for optimal performance.

It is to be understood that the invention is not to be limited to the exact construction and/or method which has been illustrated and discussed above, but that various changes and/or modifications may be made without departing from the spirit and the scope of the invention.

What is claimed is:

1. A system for recovering potential energy from a pressurized gas fuel supply which is used to power a fuel cell within a vehicle, said system comprising:

a fuel tank which stores said pressurized gas;

a conduit system which selectively and fluidly couples said fuel tank to said fuel cell;

said conduit system having at least one pressure-reducing regulator disposed therein;

an energy conversion unit including a turbine which is disposed within said conduit system and which is selectively and rotatably driven by said pressurized gas, effective to generate torque and lower the pressure of said pressurized gas, and a generator which is coupled to said turbine and which utilizes the torque generated by said turbine to generate electrical power;

a bypass valve which is effective to cause said pressurized gas to selectively bypass said energy conversion unit;

at least one sensor that is effective to measure at least one vehicle operating attribute and to generate a signal representing said measured vehicle operating attribute, a controller which is communicatively coupled to said bypass valve and to said at least one sensor, said controller being effective to receive said signal and to selectively actuate said bypass valve based upon the value of said signal; and a switching module which is electrically and communicatively coupled to said controller and which is electrically coupled to a plurality of electrical components wherein said controller selectively controls said switching module, effective to selectively transfer said generated power to at least one said plurality of electrical components.

2. The system of claim 1 wherein said plurality of electrical components comprises a compressor which is fluidly coupled to said fuel cell and which is effective to pressurize and communicate air to said fuel cell.

3. The system of claim 1 wherein said plurality of electrical components further includes a rechargeable battery.

4. The system of claim 3 wherein said controller is effective to selectively and electrically connect said battery to said compressor by use of said switching module.

5. A system for supplying pressurized hydrogen gas and air to a fuel cell within a vehicle, said system comprising:

a fuel tank which stores said pressurized a first conduit system which selectively and fluidly couples said fuel tank to said fuel cell, effective to allow said pressurized hydrogen gas to be selectively communicated to said fuel cell;

a generator for producing electrical power;

an expander which is operatively coupled to said generator, and system which is operatively coupled to said generator, and which is selectively and rotatably driven by said pressurized hydrogen gas, effective to lower the pressure of said hydrogen gas which is communicated to said fuel cell and to cause said generator to produce electrical power;

a bypass valve which is disposed within said first conduit system and which is effective to cause said pressurized hydrogen gas to selectively bypass said expander; and a controller which is communicatively connected to said bypass valve and which is selectively actuates said bypass valve, effective to cause said pressurized hydrogen gas to selectively bypass said expander; and a plurality of sensors which are effective to measure vehicle operating attributes and to generate signals representing said measured vehicle operating attributes, wherein said controller is communicatively coupled to said plurality of sensors and is effective to receive said signals and to selectively actuate said bypass valve based upon the value of said signals, and wherein said plurality of sensors comprises a fuel sensor adapted to estimate an amount of pressurized hydrogen gas remaining in said fuel tank.

6. The system of claim 5, wherein said plurality of sensors comprises:

a pressure sensor which is effective to measure a pressure value of said hydrogen gas in a certain location in said first conduit system.

7. The system of claim 5, further comprising;

a pressure regulator which is operatively disposed within said first conduit system and which controls the pressure of the hydrogen gas that is communicated to said fuel cell;

wherein said controller is communicatively coupled to said pressure regulator and controls the operation of said pressure regulator based upon said measured pressure value.

8. The system of claim 5, wherein said expander comprises a turbine.

9. A method for generating electricity in a vehicle including a battery, a tank of pressurized gas and a fuel cell which consumes said pressurized gas, said method comprising the steps of:

providing a first conduit system for transferring said pressurized gas from said tank to said fuel cell, providing an expander;

operative disposing said expander within said first conduit system;

providing a generator for producing electrical power, operatively connecting said expander to said generator; and selectively channeling said pressurized gas through said expander, effective to rotatably drive said expander, thereby causing said generator to produce electrical power; and delivering said produced electrical power to said battery effective to recharge said battery.

10. The method of claim 9 wherein said expander comprises a turbine.

11. The method of claim 9 further comprising the steps of:

measuring a vehicle operating attribute;

selectively causing said pressurized gas to bypass said expander, based upon said measured vehicle operating attribute.

12. The method of claim 11 wherein said vehicle operating attribute comprises a pressure of said gas in a certain location within said conduit system.

13. The method of claim 9 further comprising the steps of:

providing a compressor for pressurizing air;

providing a second conduit system for delivering said pressurized air to said fuel cell; and delivering said produced electrical power to said compressor, thereby causing said compressor to pressurize said air.

* * * * *